(12) United States Patent
Madan et al.

(10) Patent No.: US 7,181,464 B2
(45) Date of Patent: Feb. 20, 2007

(54) FORWARD-ONLY EVALUATION FOR XPATH INVERSE QUERY PROCESSING

(75) Inventors: Umesh Madan, Bellevue, WA (US); David A. Wortendyke, Seattle, WA (US); Geary L. Eppley, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 482 days.

(21) Appl. No.: 10/783,578

(22) Filed: Feb. 20, 2004

(65) Prior Publication Data

US 2005/0187906 A1 Aug. 25, 2005

(51) Int. Cl.
*G06F 17/00* (2006.01)

(52) U.S. Cl. .................. 707/102; 707/203; 707/204

(58) Field of Classification Search .................. None
See application file for complete search history.

(56) References Cited

U.S. PATENT DOCUMENTS

2005/0091576 A1* 4/2005 Relyea et al. ............... 715/502
2005/0198065 A1* 9/2005 Eppley et al. ............ 707/104.1
2005/0273772 A1* 12/2005 Matsakis et al. ............ 717/136

OTHER PUBLICATIONS

XML Path language (XPATH) W3C recommendation, www.w3.org/xpath Nov. 1999.*
Query Evaluation on Compressed Trees (Extended Abstract) Markus Frick, Martin Grohe, Christoph Koch 2003 IEEE pp. 1-10.
Efficient Cache Answerability for XPath Queries Pedro Jose Marron and Georg Lausen 2003 pp. 183-199.
Processing XML Streams With Deterministics Automata Todd J. Green, Gerome Miklau, Makoto Onizaka and Dan Suciu 2003 pp. 173-189.

* cited by examiner

*Primary Examiner*—Charles Rones
*Assistant Examiner*—Sana Al-Hashemi
(74) *Attorney, Agent, or Firm*—Workman Nydegger (57) ABSTRACT

An inverse query engine that uses an instruction tree to represents the queries to be applied against input, instead of applying each query individually. Each node in the instruction tree represents executable code. Each branch of the instruction tree when executed from the root node to a terminating branch node represents the instructions to be executed to process that query against the input. The instruction tree is forward-only in that once a node in a tree is processed against an input, that executable code associated with that node is not ever processed again for that node. Accordingly, processing resources and time is conserved.

32 Claims, 6 Drawing Sheets

FORWARD-ONLY EVALUATION FOR XPATH INVERSE QUERY PROCESSING

BACKGROUND OF THE INVENTION

1. The Field of the Invention

The present invention relates to query processing; and more specifically, to forward-only evaluations for XPATH inverse query processing.

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

The ability to process information is essential to the performance of a computing system. One type of processing is called "filtering". In particular, a filter is a query that returns true or false against an input. When a vast collection of filters (e.g., a filter table) are used against the input, each filter may test for different characteristics of the input. Accordingly, some of the filters may return true and some may return false, depending on the characteristics of the input. Regardless, the filters can provide significant information regarding the input. This allows the computing system to take appropriate action given the characteristics of the input. The filter table receives an input, and tests multiple queries against that input. In contrast, direct querying entails receiving a query, and testing the multiple inputs against that query. According, a filter table is a type of inverse query engine.

An XPATH filter engine is a type of inverse query engine in which the filters are defined using the XPATH language. The message bus filter engine matches filters against eXtensible Markup Language (XML) to evaluate which filters return true, and which return false. In one conventional implementation, the XML input may be a Simple Object Access Protocol (SOAP) envelope or other XML document received over a network.

In conventional inverse query engines, when a filter table is to be evaluated again an input, each filter is evaluated by executing a particular set of instructions. Each filter is evaluated independently by executing the particular set of instructions corresponding to each filter. In systems in which there are numerous filters, it may take considerable processing resources and time to perform the full evaluation on the input. This may become particularly problematic if inputs are frequently received for such evaluation.

For example, in a network environment, it is possible for a server to receive many network messages, each potentially representing one or more inputs to the inverse filter engine. Even if the server has rich processing resources, the server may become burdened or may simply not be able to handle all of the requests. Yet, inverse query engines are an effective way for computing systems to handle incoming information. Accordingly, what is desired is a mechanism that reduces the processing resources required to process an inverse query engine against an input.

BRIEF SUMMARY OF THE INVENTION

The foregoing problems with the prior state of the art are overcome by the principles of the present invention, which is directed towards an inverse query engine that uses an instruction tree to represents the queries to be applied against input, instead of applying each query individually. Each node in the instruction tree represents executable code. Each branch of the instruction tree when executed from the root node to a terminating branch node represents the instructions to be executed to process that query against the input.

The instruction tree is forward-only in that once a node in a tree is processed against an input, that executable code associated with that node is not ever processed again for that input. The queries may be compiled to be forward-only such that there is no branching back to prior executed instructions. Accordingly, processing resources and time is conserved. In an environment in which inputs are frequently received for inverse query processing, this can have a substantial performance gain for the computing system as a whole.

During operation, the inverse query engine receives an electronic message. Then, the instruction tree is executed against the electronic message. First, instructions are executed in the instruction tree leading from the root node to a main branching node. Whenever the inverse query engine encountering a branching node, the inverse query engine preserves processing context for the sequential execution up to that branching node. The inverse query engine then executes the instructions in each main branch. Execution of a main branch likewise involves executing instructions leading from the prior branching node to the next branching node. Then, second-order branches are navigated in the same manner. This process is recursively performed until all of the instructions in the tree have been executed.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to an inverse query engine that uses an instruction tree to represents the queries to be applied against input, instead of applying each query individually. Each node in the instruction tree represents executable code. Each branch of the instruction tree when executed from the root node to a terminating branch node represents the instructions to be executed to process that query against the input. The instruction tree is forward-only in that once a node in a tree is processed against an input, that executable code associated with that node is not ever processed again for that input. Accordingly, processing resources and time is conserved.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

Figure 1:
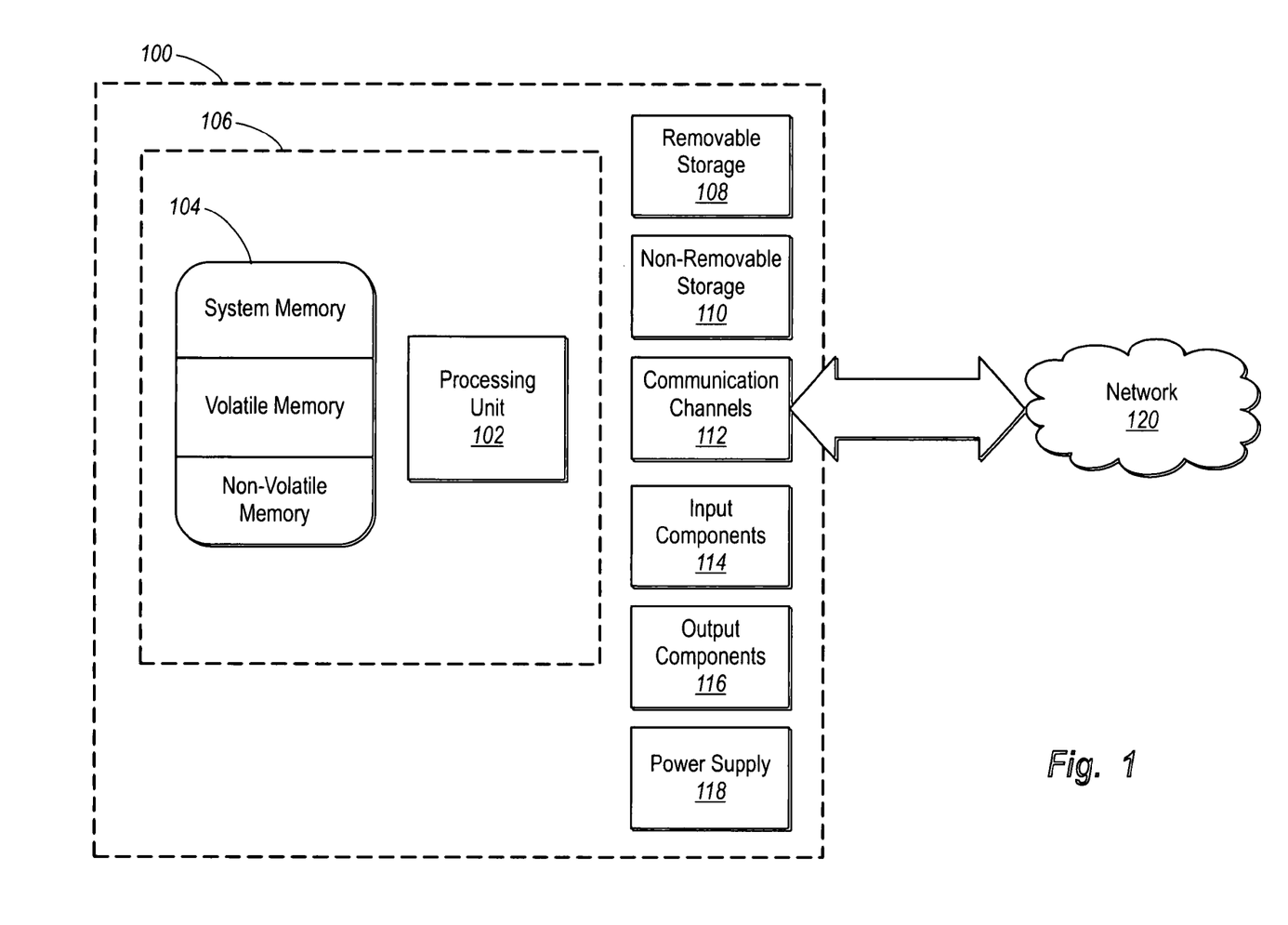
FIG. 1 illustrates a suitable computing system that may implement features of the present invention.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware. FIG. 1 shows a schematic diagram of an example computer architecture usable for these devices.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over a network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
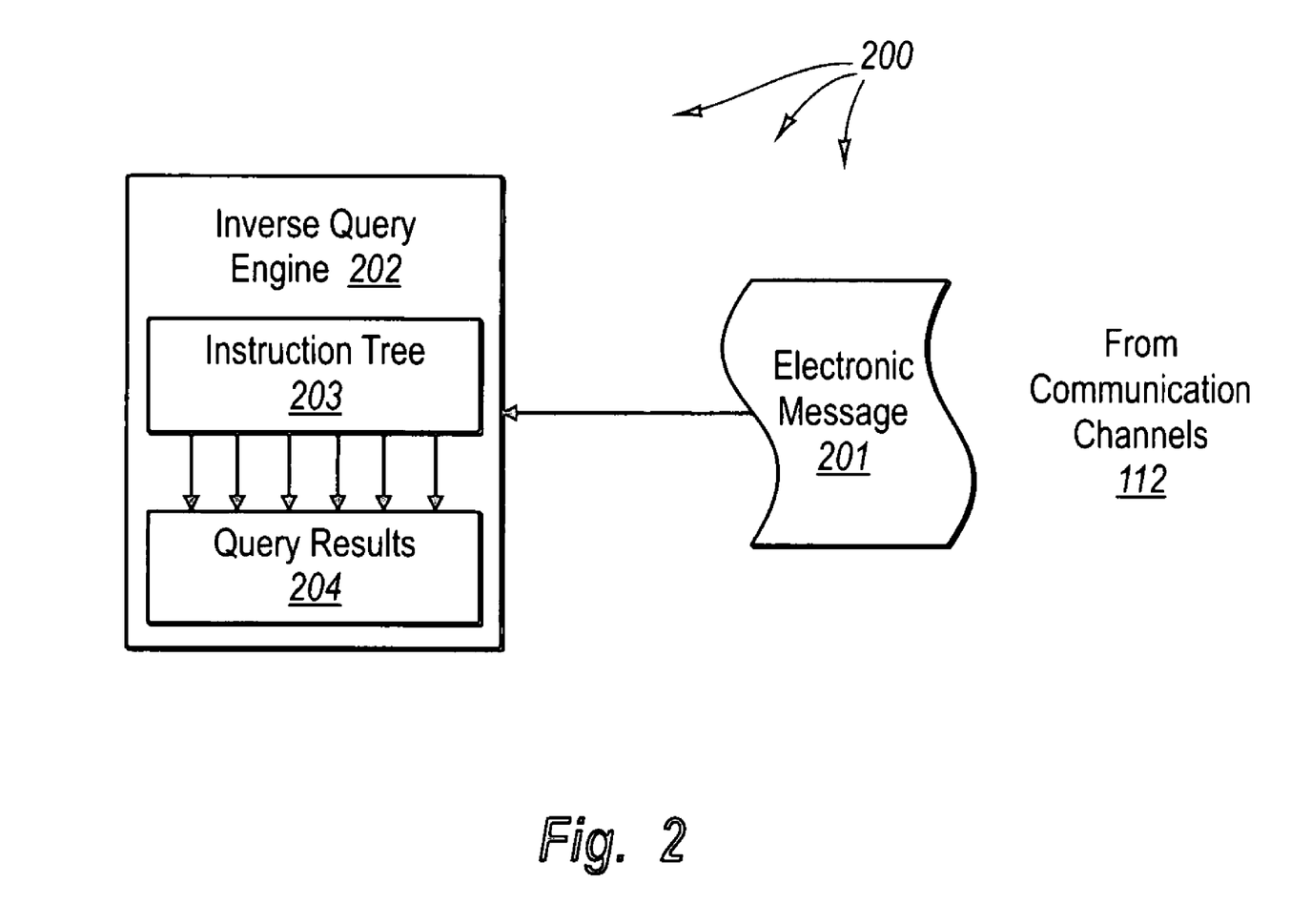
FIG. 2 illustrates an inverse query engine cooperatively interacting with an instruction tree to efficiently perform inverse querying against an input.

FIG. 2 illustrates an environment 200 in which an inverse query engine 202 cooperatively interacts with an instruction tree 203 to efficiently perform inverse querying against an input to generate query results 204. In the illustrated example, the input is an electronic message 201. When executed in the computing system 100 illustrated in FIG. 1, the electronic message 201 may be received over the communication channels 112 as represented in FIG. 1. Alternatively, the electronic message 201 may be accessed from memory 104 or storage 108 or 110, or received from input components 114. In one embodiment, the electronic message is a hierarchically-structured document such as an eXtensible Markup Language (XML) document or a Simple Object Access Protocol (SOAP) envelope.

Although the instruction tree 203 is illustrated schematically as a box in FIG. 2, the instruction tree is actually a hierarchical tree that represents execution paths for a plurality of queries. Each node of the instruction tree represents an instruction. Each branch in the instruction tree when executed from the root node to terminating branch node represents a query.

Figure 3A:
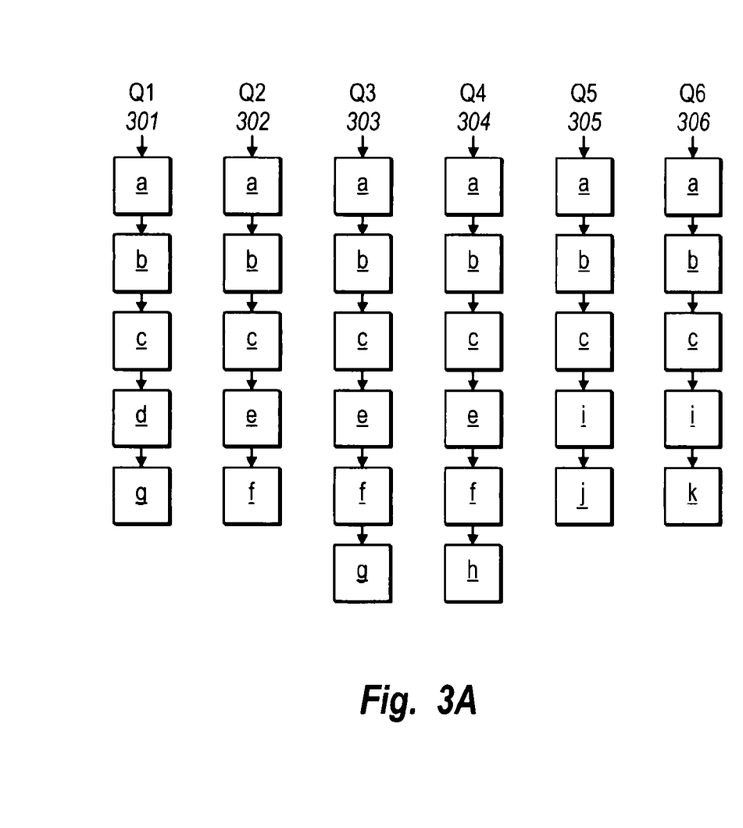
FIG. 3A illustrates a data structure in which each of multiple queries is represented in as a forward-only sequence of instructions.
Figure 3B:
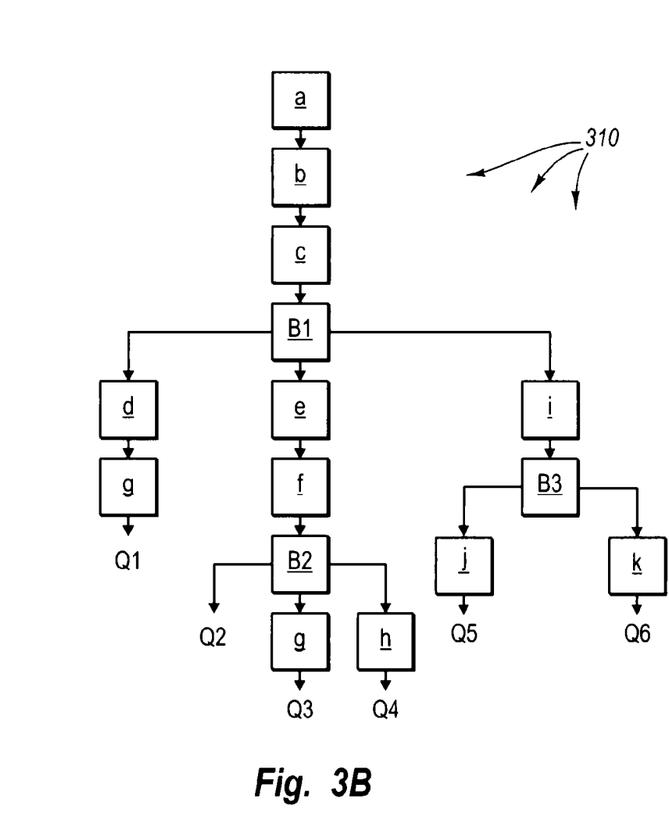
FIG. 3B illustrates a data structure in which the forward-only sequences of instructions of FIG. 3A are merged into a single tree.

To clarify this principle, a specific example is provided with respect to FIGS. 3A and 3B. However, the instruction tree is not limited to any particular structure. FIG. 3A illustrates the processing associated with four queries labeled Q1 through Q6 (see corresponding processing sequences 301 through 306) without the use of an instruction tree. The sequential processing of each query may be logically divided in groups of one or more computer-executable instructions. These groups are represented in represented in FIG. 3A using groups "a" through "k". The processing associated with each query is compiled such that execution of the groups is forward-only. In this description and in the claims, "forward-only" means that once a group of instructions is executed with respect to an query and corresponding input, that group of instructions is not again executed with respect to that query and input combination.

For example, query Q1 is processed by sequentially executing instruction groups a, b, c, d and g (see instruction stream 301). Query Q2 is processed by sequentially executing instruction groups a, b, c, e and f (see instruction stream 302). Query Q3 is processed by sequentially executing instruction groups a, b, c, e, f and g (see instruction stream 303). Query Q4 is processed by sequentially executing instruction group a, b, c, e, f and h (see instruction stream 304). Query Q5 is processed by sequentially executing instruction group a, b, c, i and j. Query Q6 is processed by sequentially executing instruction group a, b, c, i and k. Although there may be execution loops within a given instruction group, execution never proceeds backwards from one instruction group to an already processed instruction group.

In one embodiment, the queries are XPATH queries. XPATH is a functional language for representing queries that are often evaluated against XML documents. During conventional evaluation of XPATH statements against XML documents, there is significant looping in order to fully navigate the XML document. For example, if the XML document has one parent element having at least one child element, at least one of the child elements having at least one second-order child element, and at least one of the second-order child elements having at least one third-order child element, there would be a three layer "for" loop nest conventionally used to navigate the tree. However, since the XPATH evaluation has no side-effects from one loop to another, the looping process may be flattened (i.e., rewritten so that there is only a forward-execution for the evaluation). In particular, the evaluation could involve selecting applicable parent nodes, selecting application child nodes, selecting applicable second-order child nodes, and selecting applicable third-order child nodes. More regarding loop flattening will now be described.

A loop is an expression that executes a group of one or more sub-expressions repeatedly. Each repetition is termed an "iteration". The number of times a loop iterates over a group of one or more sub-expressions is known as the loop's "iteration count".

Conventional loops run sequentially. A loop with an iteration count of "n" evaluates its groups of one or more sub-expressions "n" times, one iteration at a time, with the second iteration beginning only when the first completes. Each iteration has implicit overhead, such as the stack manipulation required to make function calls.

Some expressions can be executed in a loop without side-effects. In other words, one iteration in a loop has no effect on the evaluation or results of any other iteration in the same loop. Because each iteration is effectively independent, the iterations need not be performed sequentially. In accordance with the principles of the present invention, each iteration may be flattened such that all iterations can be performed simultaneously, or in parallel. XPATH expressions do not have any side-effects. Accordingly, iterations in XPATH evaluations may be flattened.

In accordance with the principles of the present invention, flattened loops use special data structure and virtual machines to execute. Because every iteration is performed in parallel, the call stack allows arguments to be pushed for each iteration simultaneously. Instructions push and pop arguments in "frames". Each argument frame has a set of values, one for each iteration. Similarly, instructions are written to work with argument frames.

A specific example of loop flattening will now be provided to clarify these principles. The following illustrates an iterative loop draft in pseudo code and with line numbers added for clarity. The loop includes a sub-expression called "SetY(GetX(i)+Get(Y(i))" which iterates for four iterations in which "i" is varied from 0 to 3.

```
1) int count = 4;
2) for (int I = 0; I < count; ++i)
3) {
4)     SetY(GetX(i) + GetY(i));
5) }
```

This iterative loop requires backtracking. The machine has to repeatedly jump from line 5 to line 2 to repeat the execution of the sub-expression on line 4.

The following illustrates pseudo code of the above after having been subjected to loop flattening. Once again, line numbering is added for clarity.

```
1)  //  First, this gets all 4 X values in parallel
2)  int count = 4;
3)  int[ ] x = GetAllX(count); // A special function that can get all X's
4)  //  Next, this gets all Y values in parallel
5)  int[ ] y = GetAllY (count); // A special function that can get all Y's
6)  //  Now, add all X's to all Y's simultaneously
7)  x += y;   // this uses a special += operator for array operations
```

Note that this sequence does not use backtracking. The execution is forward only proceeding from line 1 to line 7. In one embodiment, a special virtual machine may be used to execute these flattened loops. Such a virtual machine uses special instructions (e.g., the +=opcode shown above) and special processing stacks.

Figure 6A:
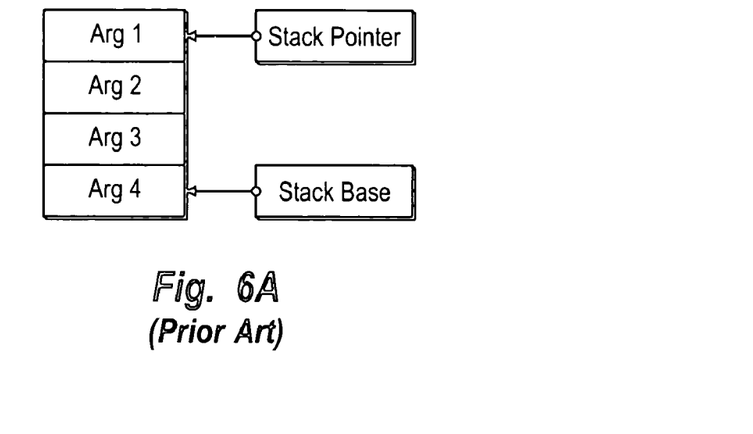
FIG. 6A illustrates a conventional stack.
Figure 6B:
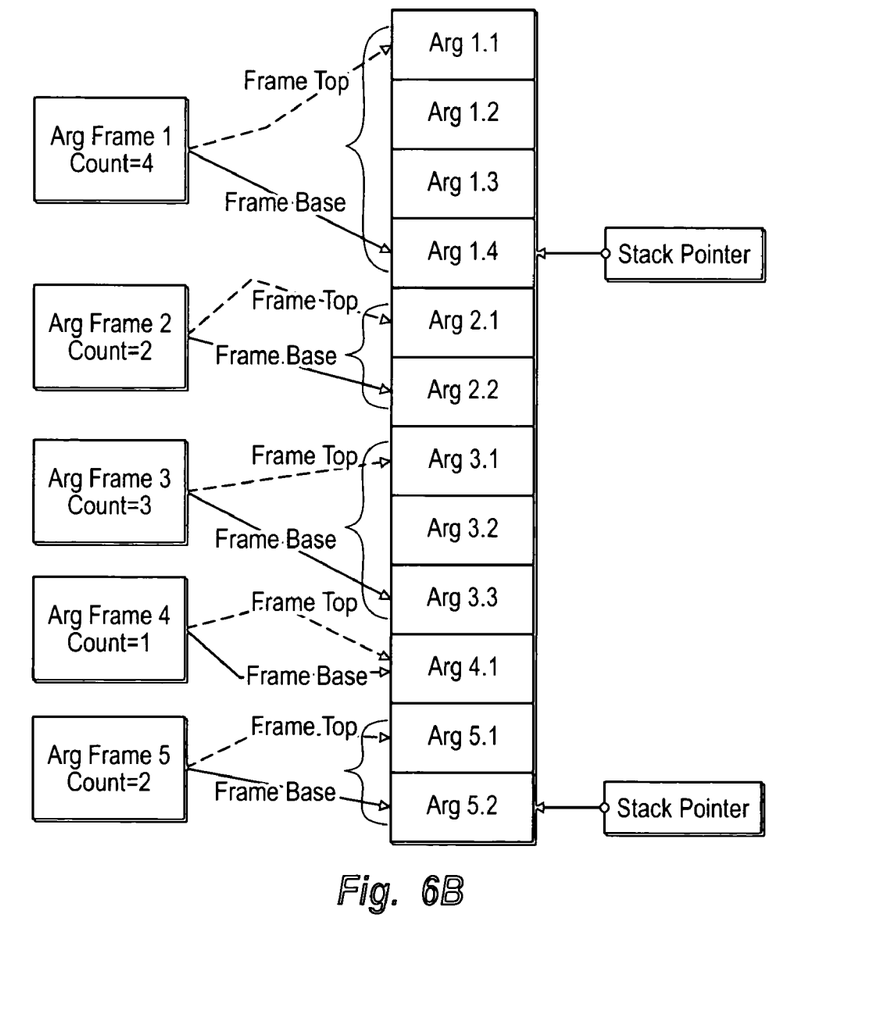
FIG. 6B illustrates an argument stack in accordance with the principles of the present invention.

Conventional evaluation stacks contain individual arguments (see FIG. 6A). However, the stacks for execution of flattened loops contain argument frames as mentioned above. Such as stack is illustrated in FIG. 6B. In FIG. 6B, Arg 1.1 is the value of Arg1 for the first iteration, Arg 1.2 is the value of Arg1 for the second iteration, and so on. Similarly, Arg2.2 is the value of Arg2 for the second iteration. The following pseudo code defines an example structure of the argument frame.

```
struct ArgumentFrame
{
    int base; // where the stack starts
    int top; // where the stack ends
    internal int Count
    {
        get { this.top – this.base + 1};
    }
}
```

As also mentioned above, the opcodes are designed to operate with argument frames. For example, the Add opcode may work as follows:

```
public Opcode Eval(ProcessingContext context)
{
    EvalStack stack = context.Stack;
    StackFrame xArg = stack.TopArg;     // gives us all Xs
    StackFrame yArg = stack.SecondArg; // give us all Ys
    // The following line ensures that the iteration counts of both
    args are equal
    // For example, we cannot have 3 Xs added to 4 Ys.
    Debug.Assert(xArg.Count == yArg.Count);
    // Perform additions - do all them simultaneously
    // This is the special += operator mentioned above
    for (int x = xArg.base, y = yArg.base ; i < xArg.top; ++x)
    {
        yArg.Update(y, stack[x] + stack[y]);
    }
    context.Stack.PopFrame( );
}
```

FIG. 3B illustrates an example instruction tree 310 in which each of the example queries of FIG. 3A are merged. Specifically, a "stem" of the instruction tree is defined as those instructions that lead from a root node of the instruction tree to the first branching node of the instruction tree. Referring to FIG. 3A, the instruction tree 310 has a root node "a" and a first branching node "B1". Accordingly, the stem of the instruction tree is represented by the instruction group sequence "a", "b" and "c". The first branching node will also be referred to herein as a "first-order" branching node or "main" branching node. For example, node "B1" is the first-order or main branching node of instruction tree 310.

Branching from the first-order branching node are several first-order or main branches. For example, the instruction tree 310 has three first-order branches, one beginning with instruction group "d", a second beginning with instruction group "e", and a third beginning with instruction group "i". The first-order branches may potentially contain second-order branching node extending into second order branches, and so on and so forth.

For example, the first-order branch beginning with instruction group "d" has no second-order branching node.

The first-order branch beginning with instruction group "e" does have a second-order branching node "B2" that extends into three second-order branches. One of these second-order branches leads directly into a termination node for query Q2. A second second-order branch includes instruction group "g". A third second-order branch includes instruction group "h".

The first-order branch beginning with instruction group "i" also has a second-order branching node "B3" that extends into two second-order branches. One of the second-order branches includes instruction group "j", and the other includes instruction group "k".

As one navigates from the root node to the terminating node in each ancestral line of the instruction tree 310, one finds the execution path for each of the queries of FIG. 3A with the inclusion of the occasional branching node to help preserve context at the appropriate time.

Figure 4:
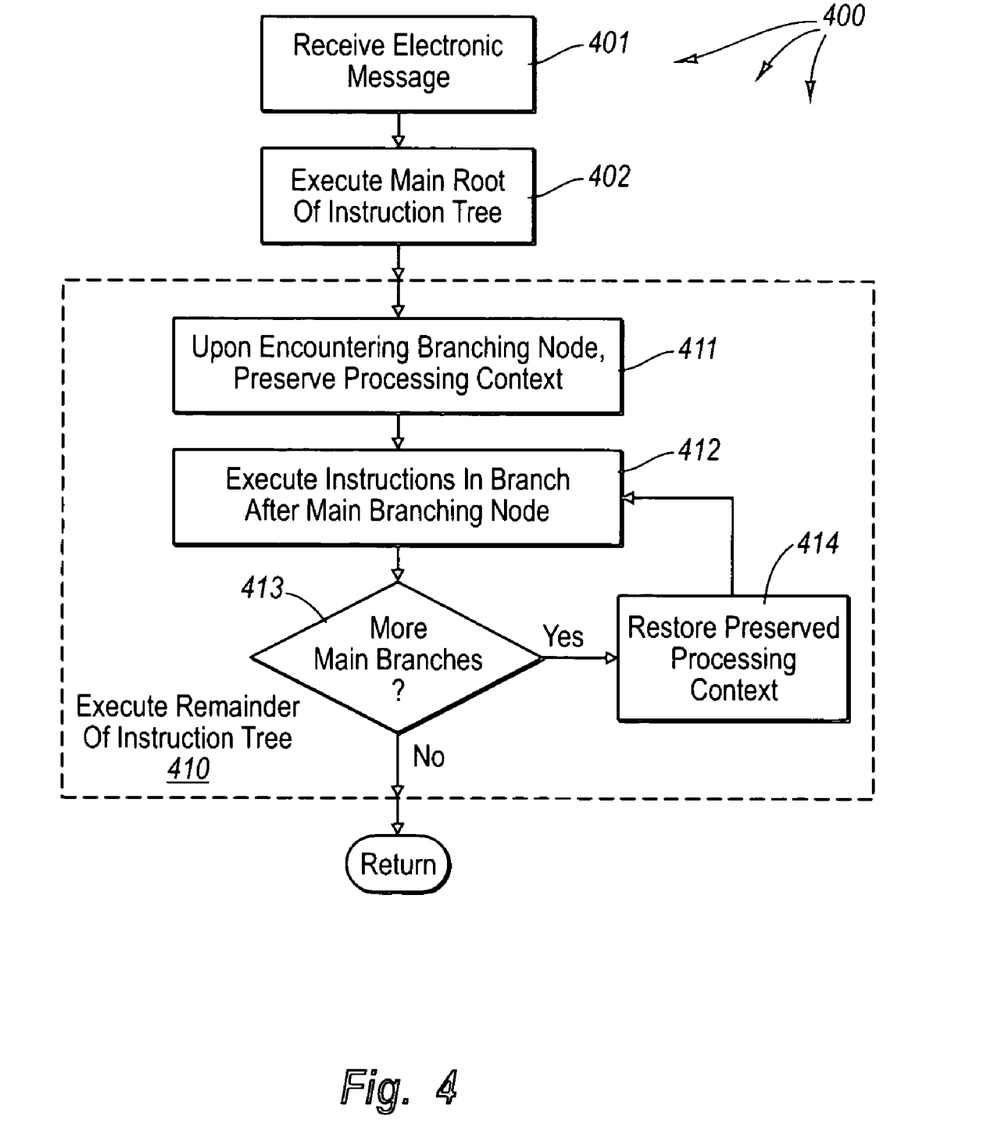
FIG. 4 illustrates a flowchart of a method for the computing system to evaluate the queries using the instruction tree rather than separately evaluating each of the queries.
Figure 5:
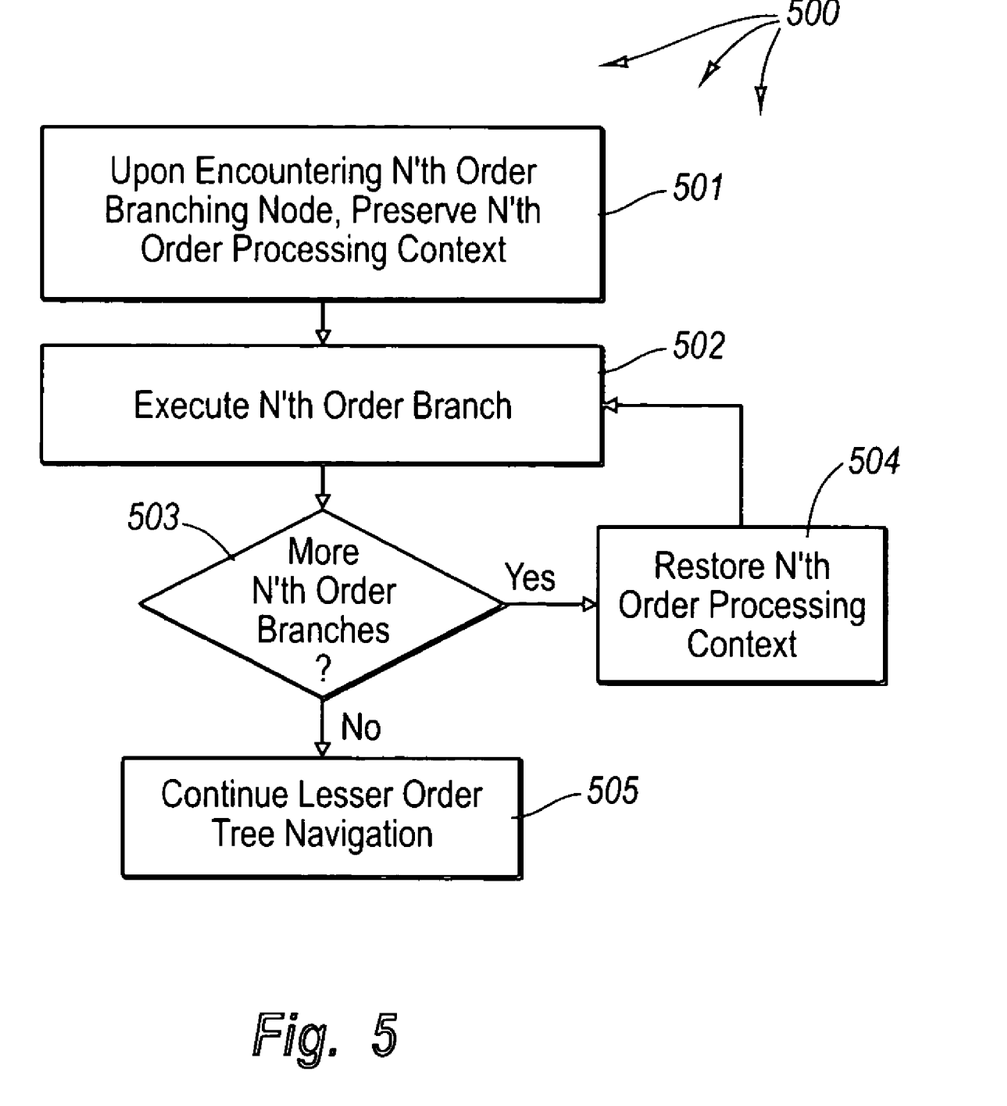
FIG. 5 illustrates a flowchart of a method for executing instructions in the instruction tree in a main branch of the instruction tree leading from the main branching node.

The processing of the instruction tree 310 will be described in further detail with reference to FIGS. 4 and 5. FIG. 4 illustrates a flowchart of a method 400 for the computing system to evaluate the plurality of queries using the instruction tree rather than separately evaluating each of the plurality of queries thereby conserving processing resources.

The inverse query process begins in response to having received an electronic message (act 401). For example, referring to FIG. 2, the inverse query engine 202 receives the electronic message 201. The electronic message 201 may be received from another network location and/or may be accessed locally.

Then, the inverse query engine sequentially executes instructions in the instruction tree leading from the root node to a first-order branching node in the instruction tree (act 402). Referring to FIG. 3B, node "a" is the root node, while branch "B1" is a main branching node. Accordingly, in the example of FIG. 3B, execution of the instruction tree 310 from the root node to the main branching node involves executing in sequence instruction groups "a", "b" and "c".

The inverse query engine then performs a functional, result-oriented step for executing the remainder of the instruction tree without redundantly executing the instructions in the instruction tree leading from the root node to a main branching node in the instruction tree (step 410). This step may include any corresponding acts for accomplishing this result. However, in the illustrated example of FIG. 4, step 410 includes corresponding acts 411 through 413.

Specifically, upon encountering the main branching node in the instruction tree, the inverse query engine preserves processing context for the sequential execution up to the main branching node (act 411). With reference to the example of FIG. 3B, after sequentially executing instruction groups "a", "b" and "c", the inverse query engine 202 encounters a branching indicator B1. This prompts the inverse query engine to preserve the processing context for execution up to that point. This processing context will also be referred to as "first-order processing context" since it represents the processing context that resulted from execution up to the first-order branching node. The processing context may be preserved in volatile or non-volatile memory or storage.

Once the first-order processing context is preserved, the inverse query engine 202 continues executing instructions in the instruction tree in a main branch of the instruction tree leading from the main or first-order branching node (act 412). For example, referring to FIG. 3B, the inverse query engine sequentially processes instruction groups "d" and "g". This leads to terminating node Q1 indicating that processing has led to a result for query Q1.

Upon completing execution of this first-order branch, the inverse query engine determines whether or not there are more main branches (decision block 413). If there are not any more (No in decision block 413), then the inverse query engine has finished evaluating the electronic message. However, in this example of FIG. 3B, there are more main branches to be evaluated (Yes in decision block 413).

Accordingly, the inverse query engine restores the first-order processing context (act 414) as a starting point for executing the instruction groups in the next main branch (act 412). This contrasts sharply with the prior art in which processing would normally begin at instruction group "a" for complete execution of all instruction groups for the next query. Instead, referring to FIG. 3B, the inverse query engine restores the processing context first preserved upon encountering main branching node B1, and then uses that restored processing context to execute in sequence instruction groups "e" and "f". After executing instructions groups "e" and "f", however, processing of this second main branch is not yet complete, for the second main branch includes several sub-branches. The more general case for how to address such sub-branches is illustrated with respect to the flowchart of FIG. 5.

More generally speaking, upon encountering an N'th order branching node (where "N" is a positive integer), the inverse query engine preserves the N'th order processing context (act 501), and then executes the N'th order branch (act 502). Note that execution of the N'th order branch may involve the navigation through yet more sub-branches. Navigation through these further sub-branches may also be performed in response to encountering higher-order branching nodes using the method 500 of FIG. 5, only with higher value of N. Accordingly, the method 500 of FIG. 5 is recursively performed as needed to navigate the entire instruction tree. Once execution of the N'th order branch is complete (act 502), the inverse query engine determines whether or not there are more N'th order branches (decision block 503). If there are more (Yes in decision block 503), then the inverse query engine restores the N'th order processing context (act 504), and executes the next N'th order branch. If there are not any more N'th order branches to execute, then the method 500 continues for lesser-order tree navigation (act 505).

Returning to the example of FIG. 3B, upon encountering second-order branching node "B2", the inverse query engine processes the first second-order branch. In this example, the first second-order branch is represented simply by Q2, indicating that the result of processing up to that point is the result of query Q2. The inverse query engine then restores the second-order processing context resulting from execution until node B2, and then executes the second second-order branch including instruction group "g". At this stage, the result for query Q3 is obtained. Then, the inverse query engine once again restores the second-order processing context and executes the last second-order branch including instruction group "h". At this stage, the result for query Q4 is obtained.

Furthermore, at this state, there are no more second-order branches to be processed for this main branch. Accordingly, the inverse query engine determines that the processing for this first-order branch is likewise complete (completing act 412). The inverse query engine then determines if there are any more first-order branches (decision block 413). In this case, there is a final first-order branch beginning with instruction group "i" (Yes in decision block 413). Accordingly, the inverse query engine then restores the first-order processing context (act 414) and then processes the final first-order branch (back to the final round of act 412).

This execution of the final branch would begin by executing instruction group "i" followed by the encountering of another second-order branching node "B3". Then, the inverse query engine would preserve the second-order processing context that results from execution to that point. Subsequently, the first second-order branch including instruction group "j" would be processed thereby resulting in the result for query Q5. The inverse query engine would restore the second-order processing context resulting from execution to the branching node B3, and then use that processing context to execute the final second order branch including instruction group "k". This would generate the query result for query Q6.

This would also complete execution for the final first-order branch. Accordingly, returning to FIG. 4, the inverse query engine would determine that there are no more main branches to be processed (No in decision block 413), and the processing of the instruction to would then end.

Note that in this entire execution of the instruction tree, once an instruction group has been executed with a certain processing context and against a certain input, that instruction group is never executed again with that same processing context and input. Accordingly, the inverse query engine in accordance with the principles of the present invention allows for more processor efficient evaluation of multiple queries against an input. This allows for even better scalability of the inverse query engine to an environment in which inputs may be frequently received (e.g., in a server environment) for evaluation against multiple queries.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The invention claimed is:

1. In a computing system capable of accessing an instruction tree that represents execution paths for a plurality of XPATH queries, in which each node of the instruction tree represents an instruction, and in which each branch in the instruction tree when executed from the root node to terminating branch node represents an XPATH query, a method for the computing system to evaluate the plurality of XPATH queries using the instruction tree rather than separately evaluating each of the plurality of XPATH queries thereby conserving processing resources, the method comprising the following:

an act of sequentially executing instructions in the instruction tree leading from the root node to a main branching node in the instruction tree;
  upon encountering the main branching node in the instruction tree, an act of preserving processing context for the sequential execution up to the main branching node;
  an act of executing instructions in the instruction tree in a first main branch of the instruction tree leading from the branching node; and
  upon completing the execution of the first main branch of the instruction tree; an act of using the preserved processing context to execute instructions in the instruction tree in a second main branch of the instruction tree leading from the main branching node.

2. A method in accordance with claim 1, the method further comprising the following:

an act of receiving an electronic message, wherein the act of sequentially executing instruction in the instruction tree is performed in response to the act of receiving the electronic message, and the electronic message is the subject of the XPATH queries.

3. A method in accordance with claim 2, wherein the electronic message is an XML document.

4. A method in accordance with claim 3, wherein the XML document is a SOAP envelope.

5. A method in accordance with claim 1, further comprising the following:
upon completing the execution of the first main branch of the instruction tree; an act of using the preserved processing context to execute instructions in the instruction tree in a third main branch of the instruction tree leading from the branching node.

6. A method in accordance with claim 1, wherein the act of executing instructions in the instruction tree in a first main branch of the instruction tree leading from the main branching node comprises the following:
an act of sequentially executing instructions in the instruction tree leading from the main branching node to a first second-order branching node in the instruction tree;
upon encountering the first second-order branching node in the instruction tree, an act of preserving a first second-order processing context that represents the processing context for the sequential execution up to the first second-order branching node;
an act of executing instructions in the instruction tree in a first second-order branch of the instruction tree leading from the first second-order branching node; and
upon completing the execution of the first second-order branch of the instruction tree; an act of using the preserved first second-order processing context to execute instructions in the instruction tree in a second second-order branch of the instruction tree leading from the first second-order branching node.

7. A method in accordance with claim 6, wherein the act of sequentially executing instructions in the instruction tree leading from the main branching node to a first second-order branching node in the instruction tree comprises the following:
an act of sequentially executing all instructions in the instruction tree leading from the main branching node in the instruction tree to the first second-order branching node.

8. A method in accordance with claim 6, wherein the act of sequentially executing instructions in the instruction tree leading from the main branching node to a first second-order branching node in the instruction tree comprises the following:
an act of sequentially executing some instructions in the instruction tree leading from the main branching node in the instruction tree to the first second-order branching node.

9. A method in accordance with claim 6, wherein the act of executing instructions in the instruction tree in a second main branch of the instruction tree leading from the main branching node comprises the following:
an act of sequentially executing instructions in the instruction tree leading from the main branching node to a second second-order branching node in the instruction tree;
upon encountering the second second-order branching node in the instruction tree, an act of preserving a second second-order processing context that represents the processing context for the sequential execution up to the second second-order branching node;
an act of executing instructions in the instruction tree in a second second-order branch of the instruction tree leading from the second second-order branching node; and
upon completing the execution of the second second-order branch of the instruction tree; an act of using the preserved second second-order processing context to execute instructions in the instruction tree in a second second-order branch of the instruction tree leading from the second second-order branching node.

10. A method in accordance with claim 9, wherein the act of sequentially executing instructions in the instruction tree leading from the main branching node to a second second-order branching node in the instruction tree comprises the following:
an act of sequentially executing all instructions in the instruction tree leading from the main branching node in the instruction tree to the second second-order branching node.

11. A method in accordance with claim 9, wherein the act of sequentially executing instructions in the instruction tree leading from the main branching node to a second second-order branching node in the instruction tree comprises the following:
an act of sequentially executing some instructions in the instruction tree leading from the main branching node to the second second-order branching node in the instruction tree.

12. A method in accordance with claim 1, wherein each instruction in the instruction tree may comprise one or more processor instructions.

13. A method in accordance with claim 1, wherein the act of sequentially executing instructions in the instruction tree leading from the root node to a main branching node in the instruction tree comprises the following:
an act of sequentially executing all instructions in the instruction tree leading from the root node to a main branching node in the instruction tree.

14. A method in accordance with claim 1, wherein the act of sequentially executing instructions in the instruction tree leading from the root node to a main branching node in the instruction tree comprises the following:
an act of sequentially executing some instructions in the instruction tree leading from the root node to a main branching node in the instruction tree.

15. A computer program product for use in a computing system capable of accessing an instruction tree that represents execution paths for a plurality of XPATH queries, in which each node of the instruction tree represents an instruction, and in which each branch in the instruction tree when executed from the root node to terminating branch node represents an XPATH query, the computer program product comprising one or more computer-readable media having thereon computer-executable instructions for executing a method for the computing system to evaluate the plurality of XPATH queries using the instruction tree rather than separately evaluating each of the plurality of XPATH queries thereby conserving processing resources, the method comprising the following:
an act of sequentially executing instructions in the instruction tree leading from the root node to a main branching node in the instruction tree;
upon encountering the main branching node in the instruction tree, an act of preserving processing context for the sequential execution up to the main branching node;
an act of executing instructions in the instruction tree in a first main branch of the instruction tree leading from the branching node; and
upon completing the execution of the first main branch of the instruction tree; an act of using the preserved processing context to execute instructions in the instruction tree in a second main branch of the instruction tree leading from the main branching node.

16. A computer program product in accordance with claim 15, the method further comprising the following:
an act of receiving an electronic message, wherein the act of sequentially executing instruction in the instruction tree is performed in response to the act of receiving the electronic message, and the electronic message is the subject of the XPATH queries.

17. A computer program product in accordance with claim 15, wherein the method further comprises the following:
upon completing the execution of the first main branch of the instruction tree; an act of using the preserved processing context to execute instructions in the instruction tree in a third main branch of the instruction tree leading from the branching node.

18. A computer program product in accordance with claim 15, wherein the act of executing instructions in the instruction tree in a first main branch of the instruction tree leading from the main branching node comprises the following:
an act of sequentially executing instructions in the instruction tree leading from the main branching node to a first second-order branching node in the instruction tree;
upon encountering the first second-order branching node in the instruction tree, an act of preserving a first second-order processing context that represents the processing context for the sequential execution up to the first second-order branching node;
an act of executing instructions in the instruction tree in a first second-order branch of the instruction tree leading from the first second-order branching node; and
upon completing the execution of the first second-order branch of the instruction tree; an act of using the preserved first second-order processing context to execute instructions in the instruction tree in a second second-order branch of the instruction tree leading from the first second-order branching node.

19. A computer program product in accordance with claim 18, wherein the act of executing instructions in the instruction tree in a second main branch of the instruction tree leading from the main branching node comprises the following:
an act of sequentially executing instructions in the instruction tree leading from the main branching node to a second second-order branching node in the instruction tree;
upon encountering the second second-order branching node in the instruction tree, an act of preserving a second second-order processing context that represents the processing context for the sequential execution up to the second second-order branching node;
an act of executing instructions in the instruction tree in a second second-order branch of the instruction tree leading from the second second-order branching node; and
upon completing the execution of the second second-order branch of the instruction tree; an act of using the preserved second second-order processing context to execute instructions in the instruction tree in a second second-order branch of the instruction tree leading from the second second-order branching node.

20. A computer program product in accordance with claim 15, wherein the one or more computer-readable media comprise physical media.

21. In a computing system capable of accessing an instruction tree that represents execution paths for a plurality of XPATH queries, in which each node of the instruction tree represents an instruction, and in which each branch in the instruction tree when executed from the root node to terminating branch node represents an XPATH query, a method for the computing system to evaluate the plurality of XPATH queries using the instruction tree rather than separately evaluating each of the plurality of XPATH queries thereby conserving processing resources, the method comprising the following:
an act of sequentially executing instructions in the instruction tree leading from the root node to a main branching node in the instruction tree; and
a step for executing the remainder of the instruction tree without redundantly executing the instructions in the instruction tree leading from the root node to a main branching node in the instruction tree.

22. A method in accordance with claim 21, wherein the step for executing the remainder of the instruction tree comprises the following:
upon encountering the main branching node in the instruction tree, an act of preserving processing context for the sequential execution up to the main branching node;
an act of executing instructions in the instruction tree in a first main branch of the instruction tree leading from the branching node; and
upon completing the execution of the first main branch of the instruction tree; an act of using the preserved processing context to execute instructions in the instruction tree in a second main branch of the instruction tree leading from the main branching node.

23. A method in accordance with claim 22, the method further comprising the following:
an act of receiving an electronic message, wherein the act of sequentially executing instruction in the instruction tree is performed in response to the act of receiving the electronic message, and the electronic message is the subject of the XPATH queries.

24. A computing system comprising the following:
system memory;
one or more processors capable of accessing system memory and instantiating the following in system memory when executing computer-executable instructions:
an instruction tree that represents execution paths for a plurality of XPATH queries, in which each node of the instruction tree represents an instruction, and in which each branch in the instruction tree when executed from the root node to terminating branch node represents an XPATH query; and
an inverse query engine configured to receiving an electronic document and evaluate the plurality of XPATH queries against the electronic document using the instruction tree rather than separately evaluating each of the plurality of XPATH queries.

25. A computing system in accordance with claim 24, wherein the electronic message is an XML document.

26. A computer system in accordance with claim 24, wherein the XML document is a SOAP envelope.

27. In a computing system capable of accessing an instruction tree that represents execution paths for a plurality of queries, in which each node of the instruction tree represents an instruction, and in which each branch in the instruction tree when executed from the root node to terminating branch node represents a query, a method for the computing system to evaluate the plurality of queries using the instruction tree rather than separately evaluating each of the plurality of queries thereby conserving processing resources, the method comprising the following:

an act of receiving an electronic message, wherein the act of sequentially executing instruction in the instruction tree is performed in response to the act of receiving the electronic message, and the electronic message is the subject of the plurality of queries;

an act of sequentially executing instructions in the instruction tree leading from the root node to a main branching node in the instruction tree;

upon encountering the main branching node in the instruction tree, an act of preserving processing context for the sequential execution up to the main branching node;

an act of executing instructions in the instruction tree in a first main branch of the instruction tree leading from the branching node; and upon completing the execution of the first main branch of the instruction tree; an act of using the preserved processing context to execute instructions in the instruction tree in a second main branch of the instruction tree leading from the main branching node.

28. A method in accordance with claim 27, wherein the electronic message is an XML document.

29. A method in accordance with claim 28, wherein the XML document is a SOAP envelope.

30. A method in accordance with claim 27, further comprising the following:

upon completing the execution of the first main branch of the instruction tree; an act of using the preserved processing context to execute instructions in the instruction tree in a third main branch of the instruction tree leading from the branching node.

31. A method in accordance with claim 27, wherein the act of executing instructions in the instruction tree in a first main branch of the instruction tree leading from the main branching node comprises the following:

an act of sequentially executing instructions in the instruction tree leading from the main branching node to a first second-order branching node in the instruction tree;

upon encountering the first second-order branching node in the instruction tree, an act of preserving a first second-order processing context that represents the processing context for the sequential execution up to the first second-order branching node;

an act of executing instructions in the instruction tree in a first second-order branch of the instruction tree leading from the first second-order branching node; and upon completing the execution of the first second-order branch of the instruction tree; an act of using the preserved first second-order processing context to execute instructions in the instruction tree in a second second-order branch of the instruction tree leading from the first second-order branching node.

32. A method in accordance with claim 31, wherein the act of executing instructions in the instruction tree in a second main branch of the instruction tree leading from the main branching node comprises the following:

an act of sequentially executing instructions in the instruction tree leading from the main branching node to a second second-order branching node in the instruction tree;

upon encountering the second second-order branching node in the instruction tree, an act of preserving a second second-order processing context that represents the processing context for the sequential execution up to the second second-order branching node;

an act of executing instructions in the instruction tree in a second second-order branch of the instruction tree leading from the second second-order branching node; and upon completing the execution of the second second-order branch of the instruction tree; an act of using the preserved second second-order processing context to execute instructions in the instruction tree in a second second-order branch of the instruction tree leading from the second second-order branching node.

* * * * *